United States Patent [19]
Madey et al.

[11] Patent Number: 5,010,555
[45] Date of Patent: Apr. 23, 1991

[54] NON-LINEAR INTRACTIVITY OPTICAL DEVICES FOR FREE ELECTRON LASERS

[76] Inventors: John M. J. Madey, 2120 Amherst St., Palo Alto, Calif. 94306; Stephen V. Benson, 624 Leksich Ave., Mountain View, Calif. 94041; John F. Schultz, 3834 Nimitz St., Eau Claire, Wis. 54701; Antonello Cutolo, Via Claudio 21, Naples, Italy, 80125

[21] Appl. No.: 560,461

[22] Filed: Jul. 25, 1990

Related U.S. Application Data

[63] Continuation of Ser. No. 338,527, Apr. 14, 1989, abandoned, which is a continuation of Ser. No. 258,081, Oct. 13, 1988, abandoned, which is a continuation of Ser. No. 186,781, Apr. 25, 1988, abandoned, which is a continuation of Ser. No. 921,923, Oct. 22, 1986, abandoned.

[51] Int. Cl.⁵ .............................................. H01S 3/00
[52] U.S. Cl. ............................................ 372/2; 372/27; 372/26; 372/22; 372/21; 372/18; 372/100
[58] Field of Search ..................................... 372/10–12, 372/21, 22, 26, 27, 100, 18

[56] References Cited
U.S. PATENT DOCUMENTS 3,626,320  12/1971  Garwin ................................. 372/26

OTHER PUBLICATIONS

A. Cutolo, Transient Behavior in the Acousto–Optic Effect, Lett. Nuovo Cimento 41, 139–144 (1984).
A. Cutolo, M. J. Madey, Second Harmonic Generation with High Power Short Pulses from a Free Electron Laser, in "Free Electron Generators of Coherent Radiation", SPIE–453, 75–84 (1983).
A. Cutolo, B. T. Yakubi, J. M. Madey, "Broadband Optical Cavities for Infrared FELs": Applied Optics, vol. 23, No. 17; pp. 2935–2943; Sep. 1, 1984.
A. Cutolo, J. M. Madey, Acousto–Optic Output Couples for Free Electron Lasers, in "Free Electron Generators of Coherent Radiation", SPIE–453, 100–107 (1983).
A. Cutolo, J. M. Madey, Self–Induced Mismatch in Non–Linear Optical Interactions, IEEE J. of Quant. Electron., QE–21, 1104–1107 (1985).

*Primary Examiner*—Léon Scott, Jr.
*Attorney, Agent, or Firm*—Townsend and Townsend

[57] ABSTRACT

The performance of free electron lasers can be greatly enhanced by including a non-linear optical element within the resonator for the oscillator. A system is described to enhance the peak or average power output of the FEL oscillator, or to modify the time structure of the oscillator output through the use of a non-linear element which modulates or diverts a portion of the optical wave circulating in the resonator.

12 Claims, 10 Drawing Sheets

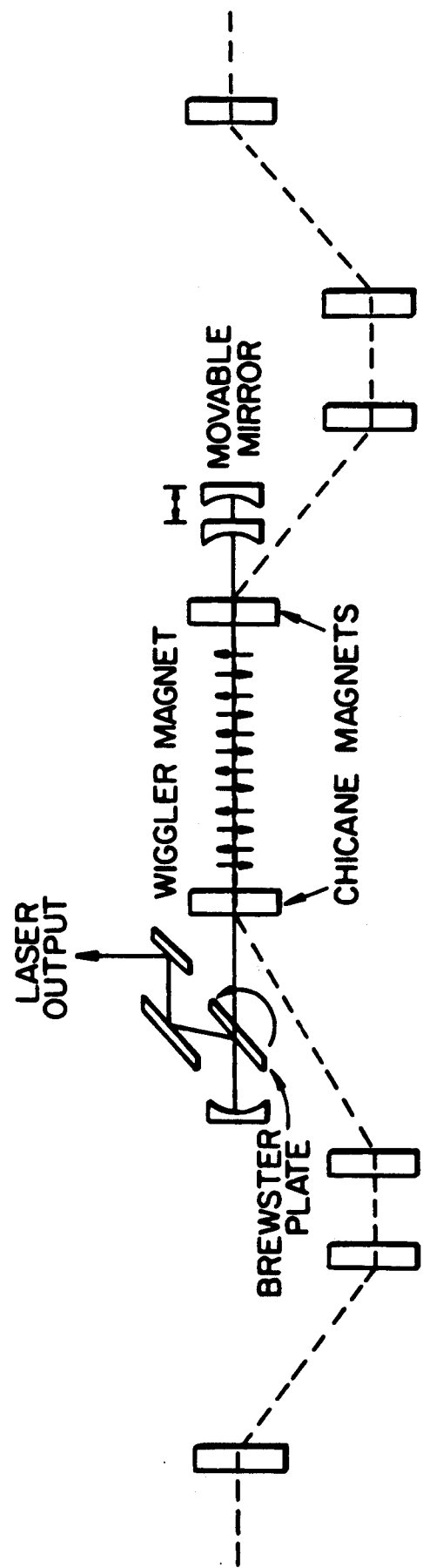
FIG._1.
(PRIOR ART)

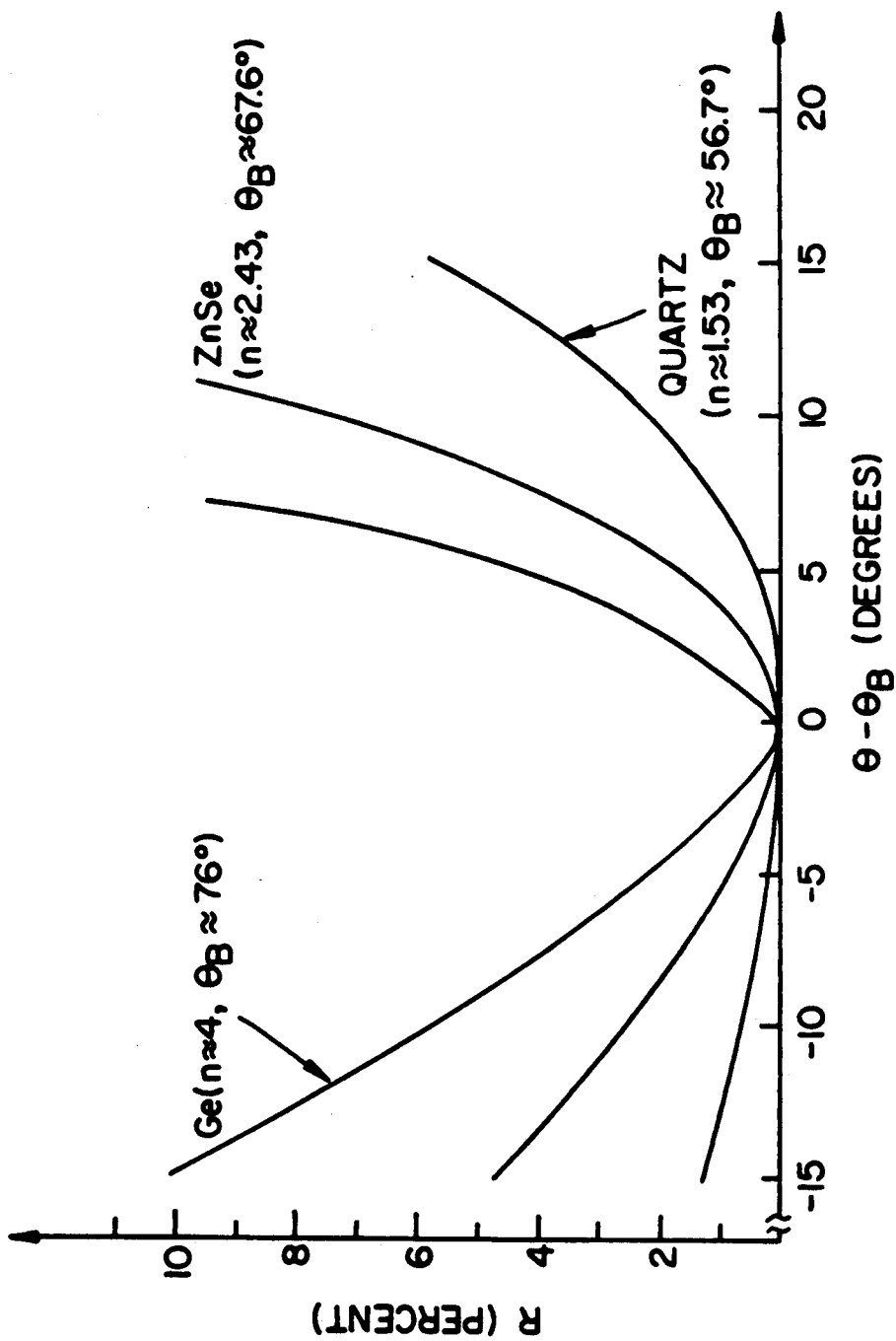
FIG._2.
(PRIOR ART)

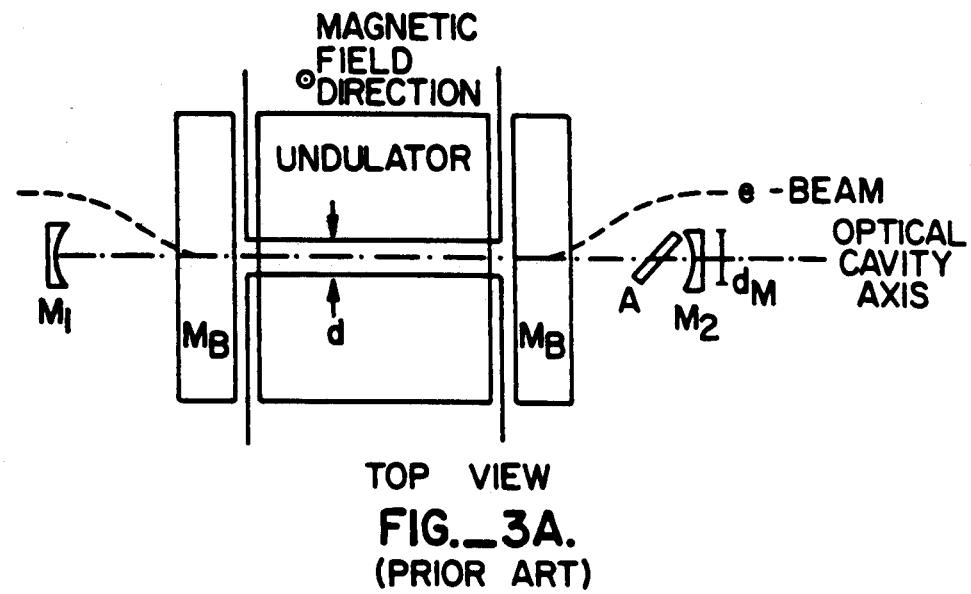
TOP VIEW
FIG._3A.
(PRIOR ART)
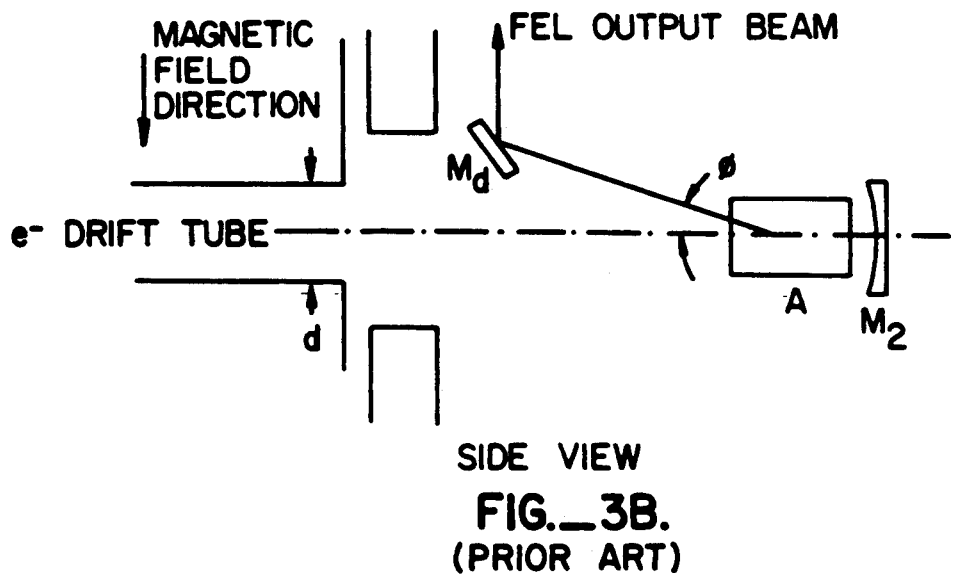
SIDE VIEW
FIG._3B.
(PRIOR ART)
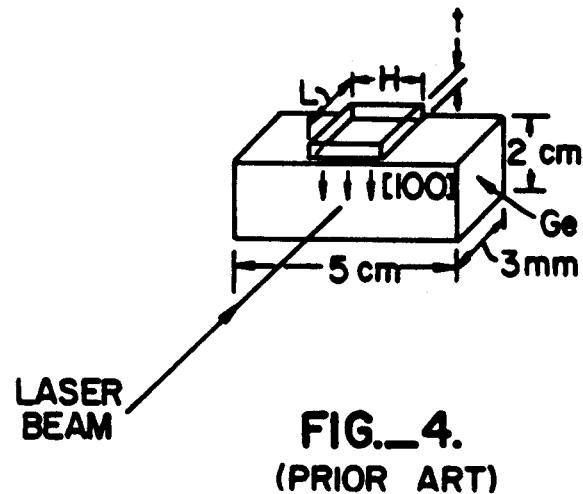
FIG._4.
(PRIOR ART)

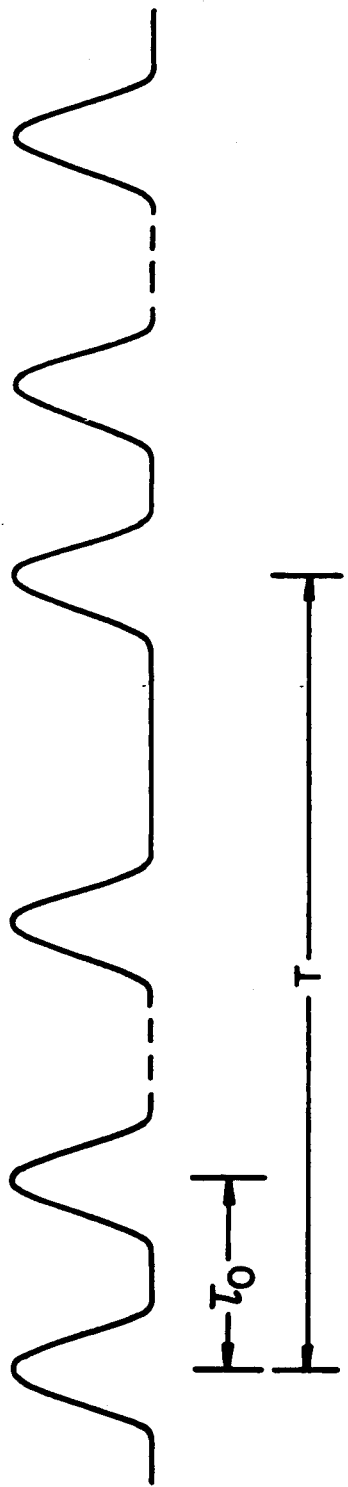
FIG._5.
(PRIOR ART)
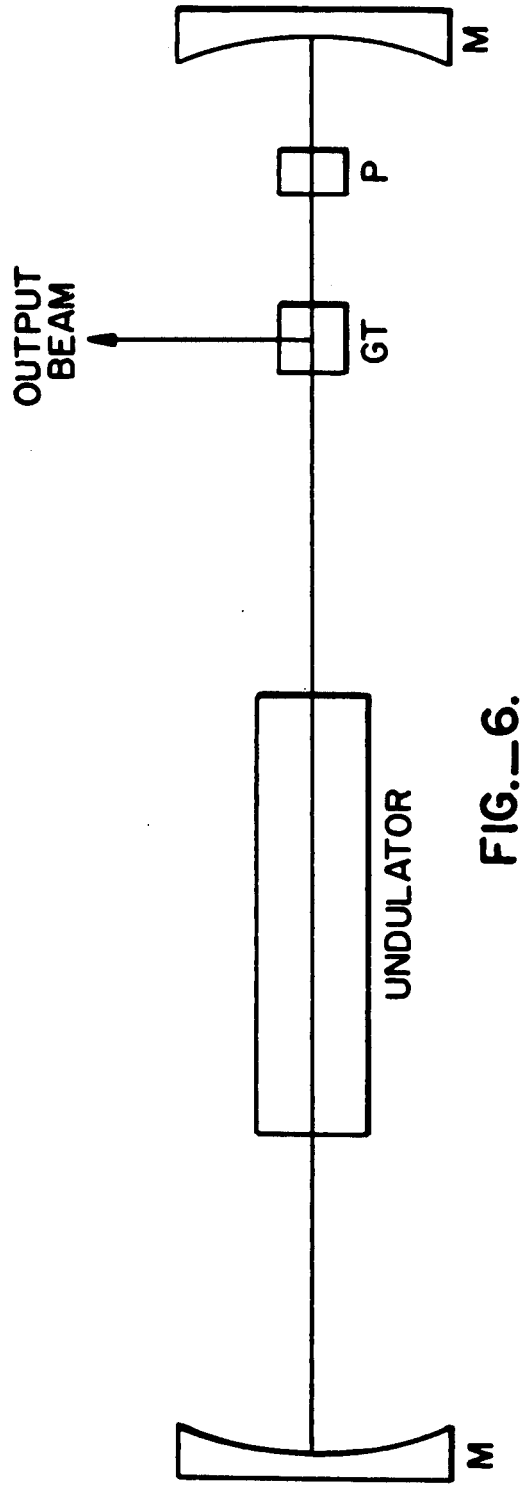
FIG._6.

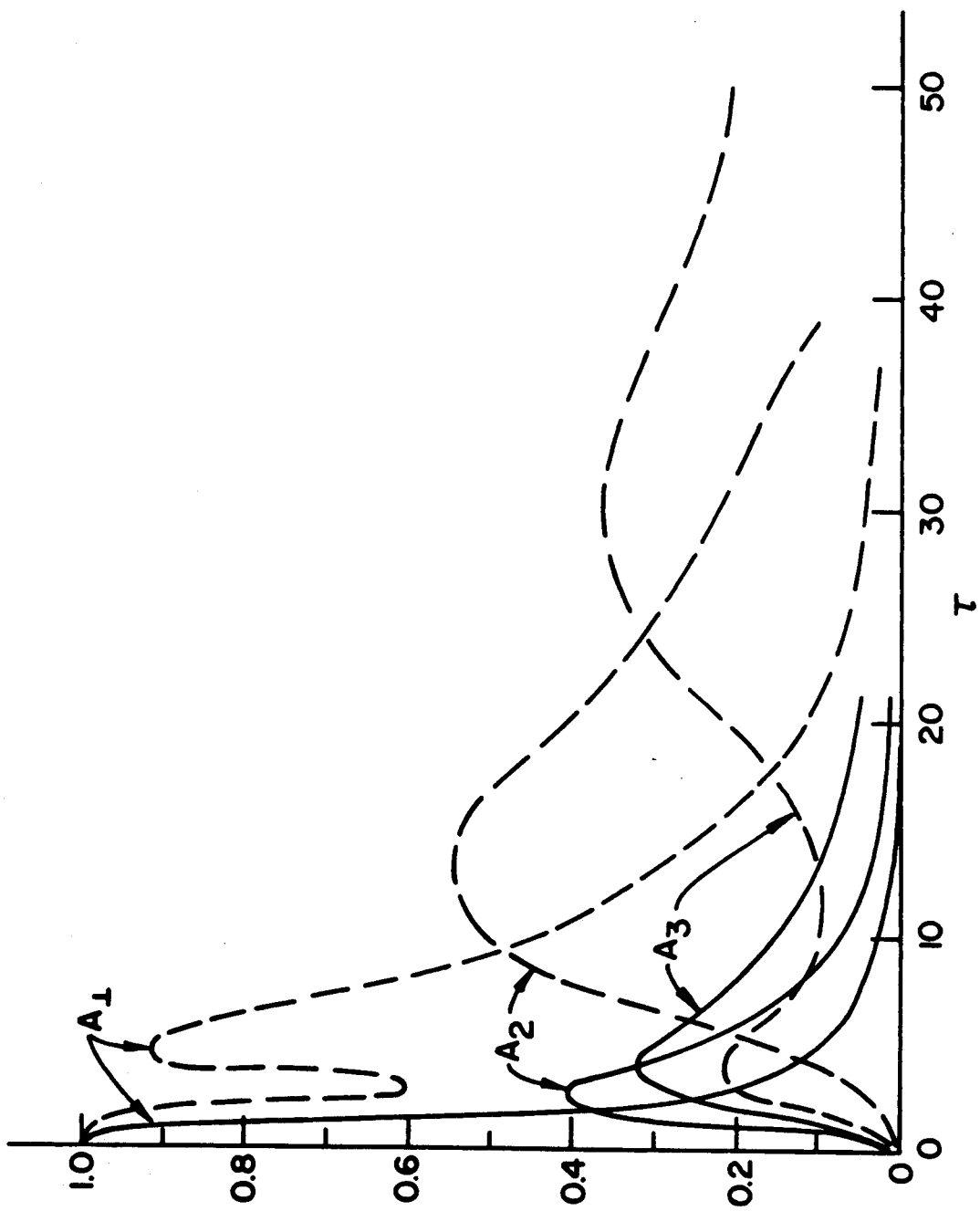
FIG._7.

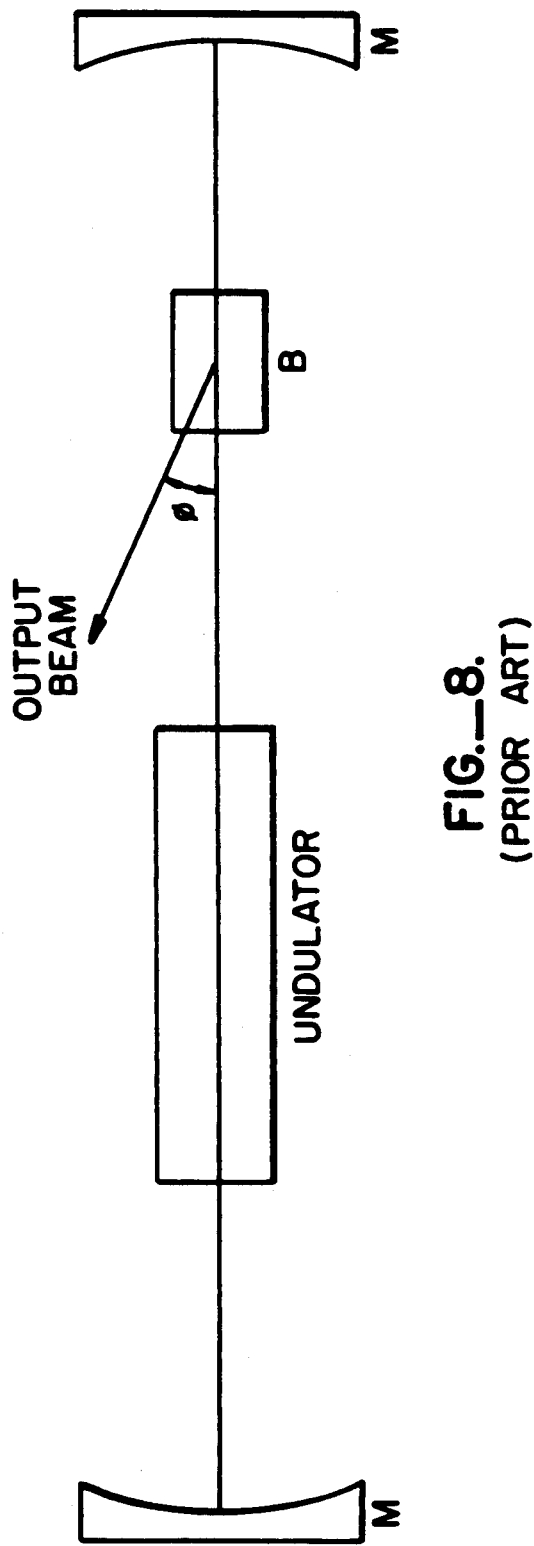
FIG._8.
(PRIOR ART)

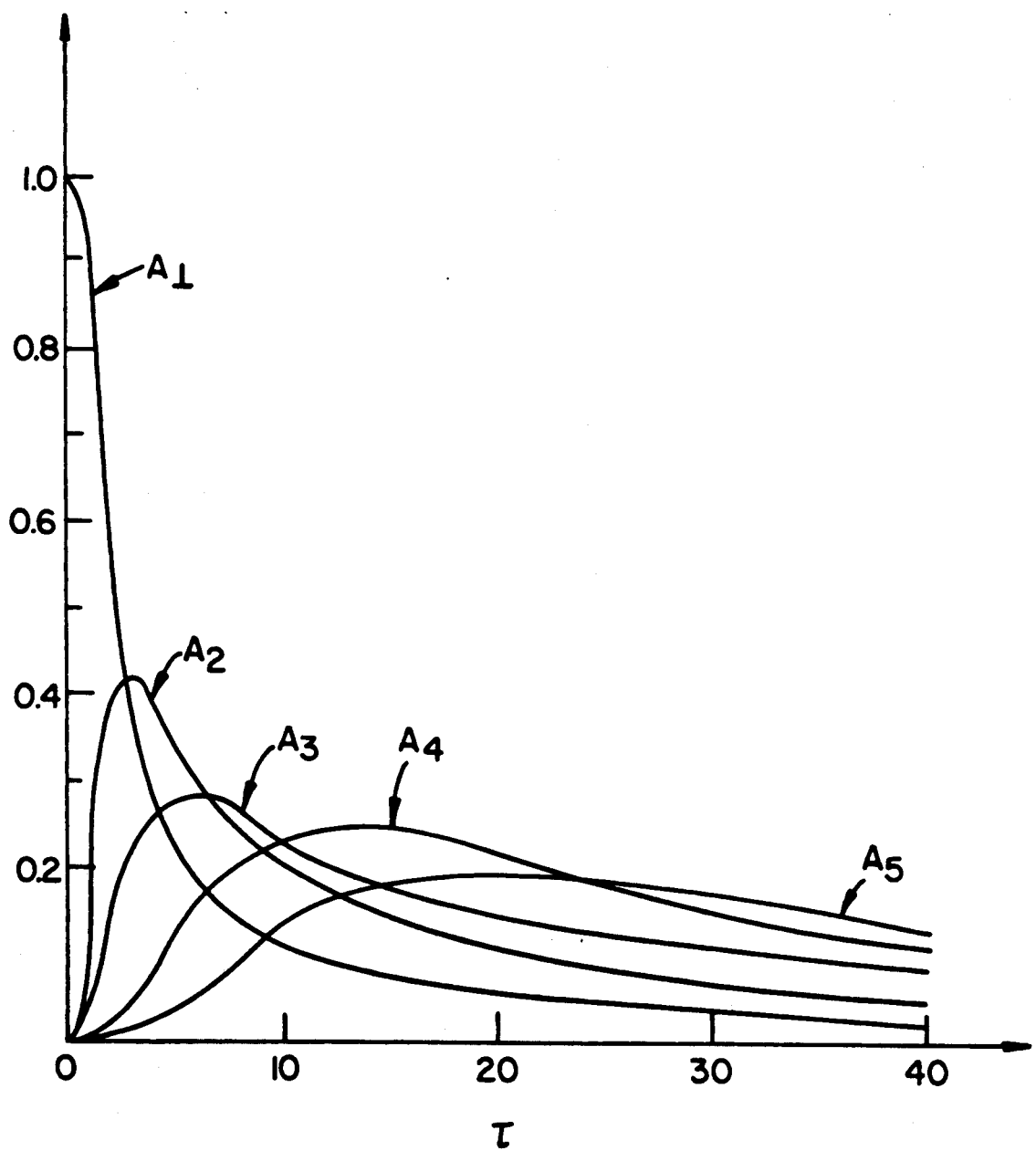
FIG._9.

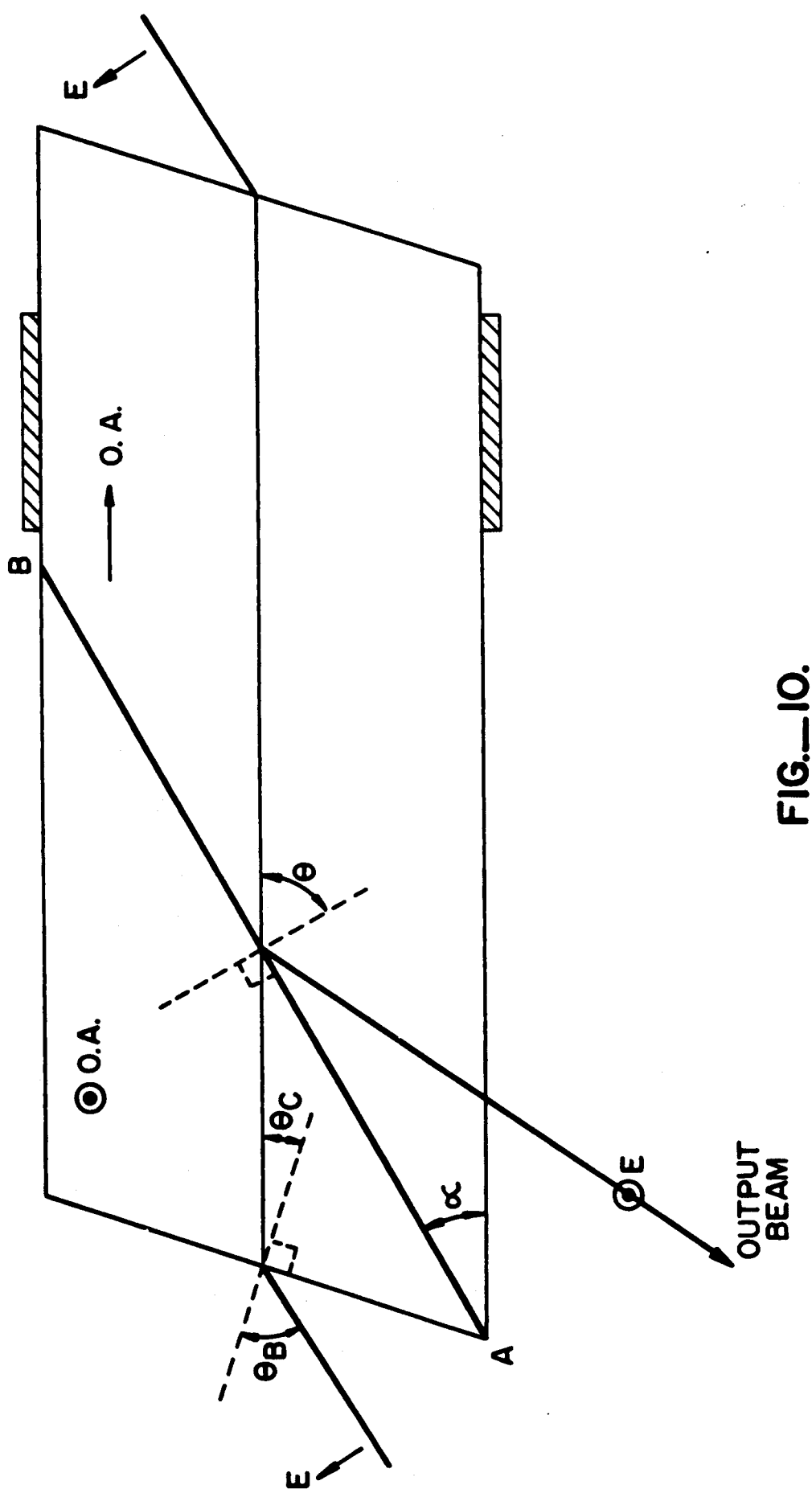
FIG._10.

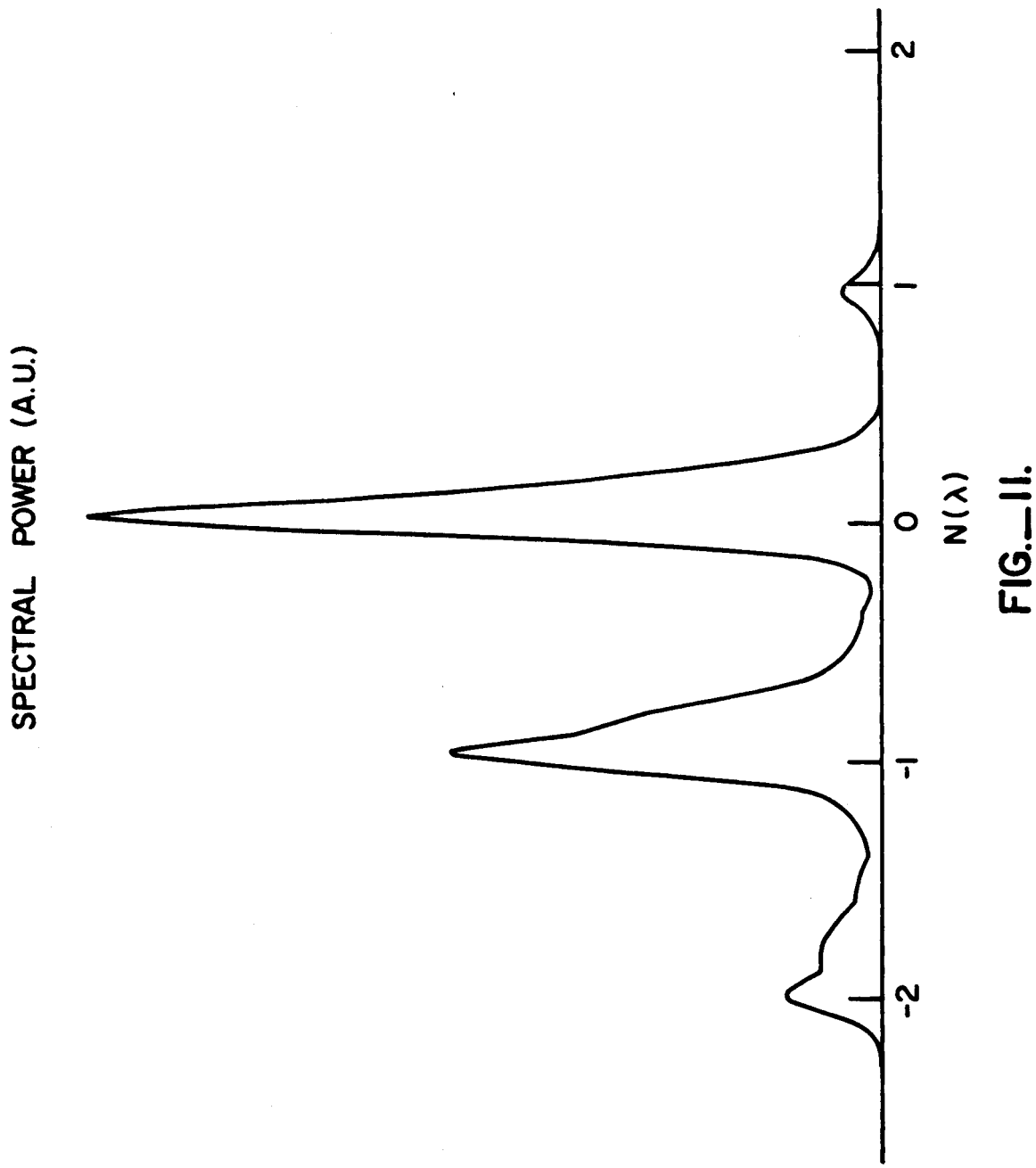
FIG._11.

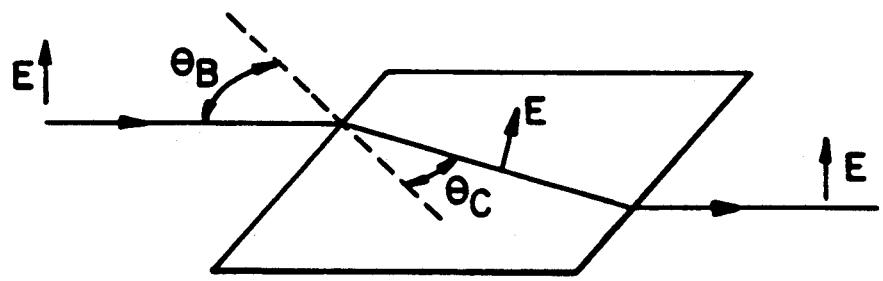
FIG._12.
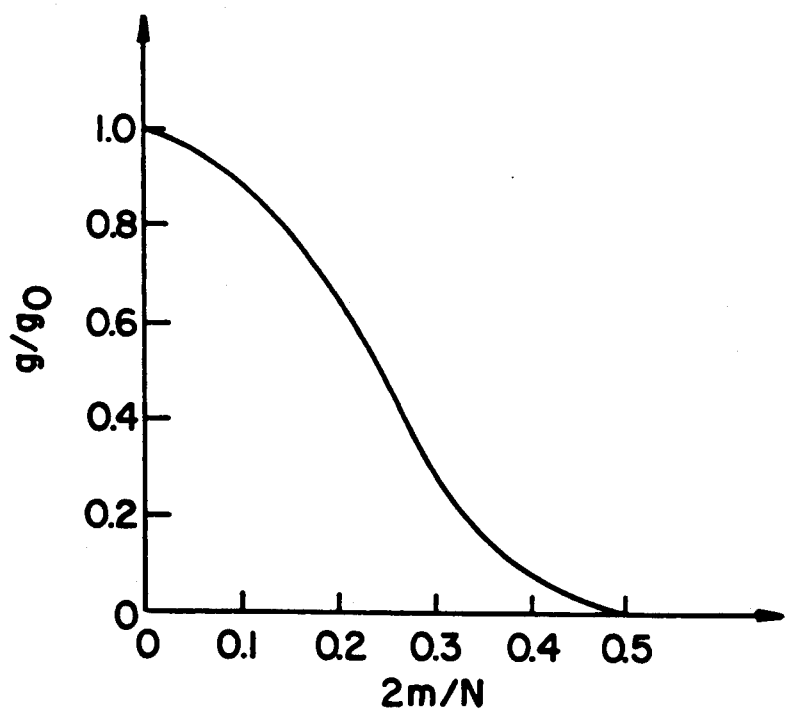
FIG._13.

NON-LINEAR INTRACTIVITY OPTICAL DEVICES FOR FREE ELECTRON LASERS

This application is a continuation of Ser. No. 338,527 filed 04/14/89, ABANDONED which is a continuation of Ser. No. 258,081 filed 10/13/88, ABANDONED which is a continuation of Ser. No. 186,781 filed 04/25/88, ABANDONED which is a continuation of Ser. No. 921,923 filed 10/22/86, ABANDONED.

BACKGROUND OF THE INVENTION

A lot of different experiments, under way in different nations have demonstrated the capability of free electron lasers (FEL,) to produce a large amount of radiation in different ranges of the spectrum (1). On the other hand each of these experiments has proved that the main limitations to the performances of an FEL come from the optical equipment used for the resonator.

The prior art for this invention includes linear output couplers for FEL oscillators, non-linear intra-cavity elements for conventional laser oscillators, and a non-linear broad band acousto-optic output coupler for FEL's.

Linear output couplers have been used for many years as components of FEL oscillators. These devices include both simple partially transmitting mirrors and intra-cavity Brewster plates tilted slightly off the Brewster angle. However, these couplers do not have the capability to modulate the FEL output pulse structure and typically permit only 1-10% of the light circulating in the optical cavity to be extracted from the resonator.

A broad variety of intra-cavity non-linear elements have also been demonstrated as components of conventional laser systems. However, the properties and problems of conventional oscillators differ substantially from the properties of the FEL. and hence the non-linear elements developed for these conventional systems either would not function as a component of an FEL, or would not yield high levels of performance. The special functions distinguishing non-linear components for FEL's from those for conventional laser oscillators include the FEL's broad-band tuneability, high peak power, and (for RF-linear or storage ring FEL's) the FEL's intrinsic mode-locked pulse. In addition, the sideband instability which limits the power output of highly saturated FEL's, is not present in conventional laser oscillators.

Finally, while a broad-band acousto-optic output coupler has been described in prior literature for FEL oscillators, this device lacked the speed necessary to extract high peak power pulses from an FEL oscillator.

SUMMARY OF THE INVENTION

The performance of a free electron laser (FEL) oscillator can be greatly enhanced by including a nonlinear optical element within the resonator for the oscillator. In this invention we describe a system to enhance the peak or average power output of an FEL oscillator, or to modify the time structure of the oscillator output, through the use of a non-linear element to modulate or divert a portion of the optical wave circulating in the resonator of the oscillator. A number of specific embodiments of the invention will be discussed, including:

(1) an acousto-optic or electro-optic mode-locker;
(2) a pulse selector consisting of an acousto-optic or electro-optic mode-locker and an electro-optic cavity dumper;
(3) an electro-optic cavity dumper;
(4) an electro-optic output coupler;
(5) an intra-cavity harmonic generator;
(6) a sideband suppression filter.

In its most general form, the invention consists of (1) a magnetic undulator comprising a set of magnets disposed periodically about an axis generating thereby a periodic transverse magnetic field along the axis, (2) a set of mirrors disposed about the axis defining a resonant optical cavity along the axis, (3) an electron accelerator system which generates a relativistic electron beam and injects the beam along the axis through the undulator, (4) a transmissive, non-linear optical element mounted on the axis within the resonator at an angle and temperature which permits a phase-matched interaction between the optical wave supported by the resonator and an externally applied acoustic or electric field, or the field of the optical wave itself, thereby modulating the amplitude or polarization of the optical wave, (5) means to generate and apply the acoustic or electric field to the non-linear element and (6) optical means to extract the modulated or deflected wave from the resonator.

The invention in its possible embodiments can improve the peak power output of an FEL by up to two orders of magnitude or can be used to vary the spacing of the optical pulse generated by an FEL over a range which would be impossible by other means. The invention can also be used to suppress the, sideband instability in high power FEL oscillators, or to increase the power available at the harmonic of the fundamental wavelength.

BRIEF DESCRIPTION OF THE DRAWINGS

FIG. 1 is a schematic of a stable optical cavity with a Brewster output coupler;

FIG. 2 is a plot of the output coupling coefficient $t=4R$ (R being the reflection coefficient) as a function of the incidence angle on the Brewster coupler for different values of the refractive index;

FIGS. 3A-B are top and side views of the FEL vacuum chamber with the optical cavity and the acousto-optic output coupler;

FIG. 4 is an oblique schematic view of the Ge acousto-optic output coupler;

FIG. 5 shows a typical time structure of the e-bunch delivered by a linac;

FIG. 6 is a schematic of an FEL with an electro-optic cavity dumper;

FIG. 7 shows plots of the relative amplitudes n of the first three pulses delivered by an electro-optic dumper as the normalized time;

FIG. 8 is a schematic of an FEL with an acousto-optic cavity dumper;

FIG. 9 shows plots of the amplitudes of the first five pulses delivered by an FEL with an acousto-optic cavity dumper as a function of the normalized time;

FIG. 10 is a schematic of the tunable low loss electro-optic cavity dumper;

FIG 11 is a typical power spectrum of the output beam delivered by an FEL with sideband instabilities;

FIG. 12 is a schematic of the tunable electro-optic sideband suppressor; and

FIG. 13 is a plot of the gain reduction induced by the electro-optic sideband suppressor.

DETAILED DESCRIPTION OF THE INVENTION

Broadband Output Coupler

One major advantage of the free electron laser (FEL) is the capability for broadband tuning through variation of either the wiggler magnetic field strength or the electron energy. But, as in any laser system, the practical attainment of broadband tunability requires broadband optical feedback. In an earlier publication we concluded that, in the IR, broadband optical feedback could best be accomplished through use of metallic mirrors in a stable optical cavity configuration. (2)

The main disadvantage of this cavity configuration is the output coupling problem. Here we describe three different solutions which can cope with this problem: a Brewster coupler, an electro-optic coupler, and an acousto-optic coupler. All of these share the common feature of a broadband tunability together with the possibility to adjust the output coupling coefficient to any desired value in order to maximize the output power. Furthermore both the e.o. and a.o. couplers allow a fast modulation (up to about 1GH$_z$) of the output coupling coefficient, thus allowing the construction of intracavity devices instrumental to increase the efficiency of an FEL (see next sections).

The simplest broadband output coupler consists of a dielectric window, mounted at Brewster angle. FIG. 1 is a schematic of a stable optical cavity with a Brewster output coupler (B). M are the cavity mirrors and D is a deflecting mirror. When the window is slightly tilted an output beam can be collected outside the cavity. FIG. 2 is a plot of the output coupling coefficient as a function of the inclination angle of the Brewster plate for different values of refracting index.

The deflection mirror (D) must be mounted to rotate parallel to the coupler in such a way that the direction of the output beam is independent of the inclination on Brewster plate. The material for the coupler must be chosen to minimize the insertion losses in the working range.

A second mirror can be mounted to return to the cavity the beam emerging from the Brewster plate in the direction opposite to the main beam. Use of such a second mirror will approximately double the power extracted from the cavity in the main beam. The coherence of the laser will be preserved if this second mirror is installed at a distance from the plate exactly equal to that of the closest end of cavity mirror.

We observe that numerical calculations have shown that use of such a coupler does not change the divergance of the FEL cavity modes even for material with a very high refractive indices like Germanium (n$\simeq$4) (3).

FIGS. 3A-B are top and side view of the vacuum chamber of the Mark III FEL with the optical cavity and the acousto-optic output coupler A. M$_B$ designates the bending magnets required to inject the electron beam into the undulator. M$_1$ and M$_2$ are the metal cavity mirrors, and M$_d$ is a deflecting mirror to extract laser beam. In Reference 3 we analyzed several different possible configurations for an acousto-optic output coupler in a metal-mirror optical cavity. After evaluating the advantages and disadvantages of each scheme, we selected the design shown schematically in FIGS. 3A-B. The output laser beam is diffracted by the acousto-optic device in a plane normal to the plane of oscillation of the electron beam. We have chosen this scheme because it introduces the lowest insertion losses and offers the possibility to satisfy both the polarization conditions on the acoustic and optical waves in the crystal which maximize the diffraction efficiency and minimize front and rear surface reflections. Inspection of the configuration in FIGS. 3A-B also indicates that the optical losses in the coupler will be independent of the position at which the radiation enters the crystal, thus preserving the basic structure of the optical modes of the resonator.

The general design considerations for acousto-optic intracavity output couplers include (1) a prescribed diffraction efficiency depending on the available small signal gain, (2) a diffraction angle ($\simeq$90 mrad) large enough to permit the practical extraction of the diffracted beam from the optical cavity (see FIG. 1).

(3) low insertion losses, (4) short switching time for cavity-dumping or high-time resolution studies, (5) minimum deflection of the optical mode position and small change of the optical path length in the cavity due to the dispersion properties of the material used for the output coupler.

To analyze the first two conditions we note that the diffraction efficiency $\eta$ and the diffraction angle $\phi_c$ are given, respectively, by (2,3)

$$\eta = \sin^2\left((\pi/2)\sqrt{(2/\lambda^2)(L/H)\,M\,P_{ac}}\right) \quad (1)$$

$$\phi_c = \frac{\lambda}{nV_s} f_{ac}$$

where $\lambda$ is the optical wavelength in vacuum; L is the interaction length of the optical beam with the acoustic wave; H is the transverse dimension of the acoustic transducer (see FIG. 4); P$_{ac}$ is the acoustic power delivered into the crystal; n, V$_s$, and M are the refractive index, velocity of the sound, and figure of merit of the host crystal, respectively; and f$_{ac}$ is the acoustic frequency. To avoid confusion, we recall that $\phi_c$ is defined as the angle between the incident and the diffracted optical wave vectors inside the crystal. We explicitly observe that Eq. (2) is based on the complete phase matching condition. The influence of this factor together with the problems caused by self-induced thermal gradients and linewidth effects have been discussed in prior publications (3,4).

FIG. 4 shows a schematic of a Germanium acousto-optic output coupler with the acoustic transducer. Table I sets forth the main parameters of LiNbO$_3$ and be useful to build acoustic coupler in the visible and infrared range (up to 20 $\mu$m for Ge). More detailed considerations for the design of the acoustic coupler can be found in references (2,3).

The acoustic transducer is required to have a fairly wide bandwidth to accommodate an interaction with the laser beam over all the timing range. To secure this broadband match, we must in principle be concerned with two matching problems: the acoustic match of the transducer with the crystal used as the output coupler, and the electrical match of the transducer with the generator used to drive it. Fortunately, the acoustic match is straightforward. The acoustic impedance defined as the ratio between the velocity of the sound and the density has nearly the same value for most of the possible materials for Brewster plates transducers end.

With regard to the electric matching problem, we observe that equivalent input impedance of a transducer $Z_{eq}$ has a resistive and a capacitive part, both components are roughly proportional to the quantity $t/Af_{ac}$ (t is the thickness of the transducer). In typical acoustic transducers A is a few square millimeters, and the couplers are designed to work only at one wavelength. Under these conditions it is easy to get $Z_{eq}$ close to 50 $\Omega$, and the capacitive part can be compensated by using an appropriate inductor. This can easily provide a nearly perfect electrical match. However, this reactive matching cannot be used with a broadband output coupler because the bandwidth of the transducer shunt capacitance and the matching inductor would be too small. (2)

To analyze the switching time of the acoustic transducer we define a relative responsivity function r(t) which is zero at $t=0$ (when the power supplier is turned on) and is one for $t \to \infty$. Its behavior describes the buildup of the acoustic power inside the coupler since the time when the power is turned on. On this line of argument we can then write (5)

$$r(t) \approx \text{sinc}^2\left(\frac{t_m}{t}\right) erf\left(\frac{V_s t}{w}\right) \tag{2}$$

where erf(x) is the error function and $\text{sinc}(x)=(\sin x)/x$. In Eq. (2) the sinc factor is due to the phase matching condition (5) while the second one takes into account the time needed to the acoustic wave to cross the optical beam. $V_s$ is the velocity of the sound in the a.o. device, W is the 1/e spot radius of the optical beam, and the $t_m = 2\pi\lambda L/\lambda_s V_s$ where $\lambda$ is the optical wavelength, $\lambda_s$ is the acoustic wavelength and L is the length of the interaction range of the optical beam with the acoustic wave.

In typical practical cases $t_m$ is of the order of a few nanoseconds, and as $t_c$ is never less than at least 10-15 ns. Eq. can then be simplified $$r(t) = erf(t/t_0) \tag{2b}$$

with $t_0 = W/V_s$. Acousto-optic output couplers designed according to these principles have been described in the prior literature.

The electro-optic output coupler described in this application can be designed in at least two different ways (6)

1. Electro-optic cell and Glann-Thomson prism working either at Brewster angle or at normal incidence (using an anti-reflecting coating).

2. An e.o. cell working at the Brewster angle and providing the output beam through reflection of the beam on one of the faces of the cell due to the rotated polarization.

According to the previous discussion antireflecting coatings should be avoided to obtain the maximum range of tunability. In addition we note that any a.r. coating tends to decrease the damage threshold of optical surfaces.

Independent of the particular configuration, each of these schemes share the same principles of operation. When no voltage is applied to the e.o. cell the beam travels back and forth through the cavity experiencing only the insertion losses of the device. When a voltage is applied to the e.o. cell, the induced rotation of the polarization of the incident beam results in an output coupling coefficient q determined by the relation (7).

$$q = \sin(\pi V/V_\pi) \tag{3}$$

where $V_\pi$ is the "$\pi$- voltage" depending on both the crystal and the configuration chosen to exploit the electro-optic effect (either transverse or longitudinal (6)). References (7) can be seen for a more careful discussion of this point.

Following the same reasoning as for the acousto-optic coupler, we can define again a responsivity function r(t) which in this case would be:

$$r(t) \approx \sin^2\left[\frac{\pi}{2} \frac{V_0}{V_\pi} [1 - \exp(-t/t_0)] \text{sinc}\left(\frac{2\pi\tau_t}{t}\right)\right] \tag{4}$$

where $V_0$ is the voltage applied to the e.o. cell, (typically 0.5 kv) $t_0$ is the rise time of the power supply (typically 10-15 ns) and $\tau_t$ is the time of flight of the beam through the crystal given by $\tau_t = L/nc$ (L and n are the length and the refractive index of the crystal respectively, c is the velocity of the light) (typically $\tau_t \approx 0.5$ ns). Since in practical cases $\tau_t << t_0$ we can write $$r(t) \approx \sin^2\left[\frac{\pi}{2} \frac{V_0}{V_\pi} [1 - \exp(-t/t_0)]\right] \tag{5}$$

Build-Up Of The Intracavity Radiation

The build-up of the radiation inside an FEL cavity can be extended using the relation:

$$I_n \approx I_0 \prod_{m=0}^{n} \exp[g(I_{m-1}) - q - p] \tag{6}$$

where q is the output coupling coefficient, p are the losses of the cavity per pass, $g(I_{n-1})$ is the total gain per pass, $I_n$ is the intracavity intensity after the n-th microbunch is passing through the cavity. While exact form of $g(I_n)$ is not presently available in closed form, preliminary (8) numerical computations have shown that where all of the inhomogeneous effects are negligible, we can write $$g(I) \approx g_0/(1 + I/I_s) \tag{7}$$

with a relative error less than $10^{-2}$. We note that $I_s/I_0 \approx 10^9$ and that $g_0$ is the small signal gain. Eq. (7) can be simplified to $$g(I) = \begin{cases} g_0 & \text{for } I < I_s \\ q + p & \text{for } I > I_s \end{cases} \tag{8}$$

$I_{s0}$ being the value of I which saturates the gain. From Eqs. (6,7) we derive $$I_{s0} = I_s\left(\frac{g_0}{g + p} - 1\right) \tag{9}$$

For the analysis of FEL cavity dumper, we assume $I_0=1$ and that the tuning condition $\tau c/2l=s$ (s being an integer) is satisfied by $s=1$. In addition since the dispersive properties of practical intracavity devices will be significant only for subpicosecond pulses (4), we can assume that the pulse length is unaffected by the output coupler. Consequently, we conclude that the output power $P_n$ generated by the n-th microbunch is $$p_n = \begin{cases} q \exp[(g_n - q)n] & n < N_s \\ q\sigma & n > N_s \end{cases} \quad (10a)$$

where $\sigma = P_{sat}/P_0$ and $N_s = \tau_s/\tau \simeq lg\sigma/(g_n-g)$ is the number of passages required to get the saturation. From Eq. (6) we can write the average power delivered by the FEL for each macrobunch as $$p = \frac{1}{m} \sum_{n=1}^{M} P_n \quad (11a)$$

$$= q \frac{\exp[M(g_N - q)] - 1}{\exp[g_N - q] - 1} \text{ for } M < N_s$$

$$= q\left(\frac{N_s}{M} \frac{\sigma - 1}{\exp[g_N - q] - 1} + \left(1 - \frac{N_s}{M}\right)\sigma\right) \simeq \quad (11b)$$

$$q\sigma\left[\frac{N_s}{M} \cdot \frac{1}{g_N - q} + 1 - \frac{N_s}{M}\right] \text{ for } M > N_s$$

$M=T/t$ (FIG. 5) being the number of microbunches contained in each macrobunch and $g_N = g - P$.

Two limiting forms of three expressions can be developed. The first one is for the case of an FEL working only in the small signal gain regime (see Eqs. 6a, 7a). The second limiting case applies when the FEL saturates after a few passages $N_s << M$ so that Eqs. 10b, 11b can be simplified to $$P_n \simeq \bar{P} \simeq q\sigma \quad (12)$$

We note that, in the small signal gain limit, Eqs. 10a, 11a lead us the optimum values of g which can maximize either $P_n$, the power of the last pulse, or the average output power $\bar{P}$ according to $$\text{MAX}(P_n) = \frac{1}{M} \exp(g_N M - 1) \text{ for } q = 1/M \quad (13)$$

$$\text{MAX}(\bar{P}) = \frac{1}{Mg_N} \frac{\exp[(Mg_N^2 - 1)/g_N] - 1}{\exp[Mg_N^2 - 1)/Mg_N] - 1} \text{ for } q = \frac{1}{Mg_n}$$

Variable output couplers such as the acousto-optic and electro-optic couplers described above can be used in several ways to modify the performance of an FEL. Operated as a Q-switch or cavity dumper, the output coupling coefficient q is kept equal zero during the build-up of the radiation inside the cavity and then abruptly set at $q=1$ to allow the complete output of the stored radiation. To focus attention on the basic principles of cavity dumpers, we can simplify the discussion by considering only the two prior limiting cases: FELs, which do not saturate and FELs with a short saturation time ($t_s/\tau << 1$). Hereafter an asterisk will indicate the quantities calculated when operating in the cavity dumped mode.

Let us first consider non-saturating FELs. One possible operation mode is to keep $q=0$ during all the macropulse and to switch at $q=1$ just before the last microbunch is entering the FEL. Following the previous discussion we can write $$P^* = \exp(Mg_N) \quad (14)$$

for which the power averaged over the macropulse (6) reads $$\bar{P}^* = \frac{1}{M} \exp(Mg_N) \quad (15)$$

If we define the two ratios $\eta = P^*/P$ and $\bar{\eta} = \bar{P}^*/\bar{P}$, we get $$\eta \simeq \frac{\exp(Mg_N)}{g \exp[M(g_N - q)]} = \frac{\exp(Mg)}{g} >>> 1 \quad (16)$$

and $$\bar{\eta} \simeq \frac{\exp(qM)}{M} (q_N - q) >>> 1 \quad (17)$$

On the other hand if we consider the ratios $\eta_0$ and $\bar{\eta}_0$ given by the values of $\eta$ and $\bar{\eta}$ obtained by substituting for P and $\bar{P}$ their optimized values with respect to q then we obtain:

$$\eta_0 \simeq y^2_n \exp(1/g_n) \quad (18)$$

and $$\bar{\eta} \simeq 2.7M > 10^3 \quad (19)$$

Equations (11-15) show the benefits of using cavity dumping in non-saturating FEL's. As we shall below, although these ratios are reduced by the transient responsivity of the dumper, these benefits are still quite attractive.

To provide the same analysis for rapidly saturating FEL's we first calculate the time $\tau_s^*$ needed to reach saturation when $g=0$. By Eqs. (6-8) we obtain:

$$\tau_s^* \simeq 2l/c \cdot lg \, \sigma/g_N \quad (20)$$

In addition, it is easy to see that in this case $$\bar{\eta} = 1/q$$

$$\eta \simeq \frac{g_N \sigma}{q/g\sigma}\left(\frac{\tau_s}{\tau_0} \frac{1 - \exp[(g_N - q)M]}{1 - \exp(g_N - q)} + \frac{\tau_0 - \tau_s}{\tau_0} \sigma\right) \quad (21)$$

$$\frac{\tau_0}{\tau_s} \tau_s/\tau_0 < cl \frac{g_N}{g/g\sigma} \cdot \frac{\tau_0}{\tau_s}$$

where the factor $\tau_0/\tau_s$ takes into account the fact that the cavity dumping can take place $\tau_0/\tau_s$ times during one macropulse.

Comparison of the above with Equations (17,18) show that, although cavity dumping can improve the peak power output of saturated FELs, the benefits in average power are smaller than by non-saturated FELs.

The analysis above relies on the hypothesis that the switching time of the output coupler is equal to zero. As a consequence of this assumption we have secured a single pulse at the output of the FEL. While the total emitted power is independent of the switching time of the dumper, the temporal structure of the output power strongly depends on this assumption.

In order to analyze the temporal distribution of the power delivered by a cavity dumped FEL we assume, that, during the depletion of the cavity, the optical pulse, stored in the cavity, is not affected either by the losses of the cavity or by the laser gain. We can therefore describe the pulse train travelling in the cavity as a constant amplitude pulse train:

$$I_c(t) = \sum_{n=0}^{\infty} \frac{1}{t_L \sqrt{\pi}} \exp\left[-\left(\frac{t - nt_c}{t_L}\right)^2\right] \quad (22)$$

where $t_L$ is the pulse length and $t_c = 2l/c$ (l being the optical cavity length) coincides, because of the tuning condition, with the time separation between pulses. In Eq. (22) we have put the energy of each pulse equal one. The output power can be written as $$I(t) = r(t) \cdot \sum_{n=1}^{\infty} I_n \cdot \frac{1}{t_c \sqrt{\pi}} \exp\left[-\left(\frac{t_n - nt_c}{t_L}\right)^2\right] \quad (23)$$

with $I_n = I_o - \sum_{m=0}^{n-1} I_m$

As most of the present FELs have pulse length shorter than 200 ps and as this time is much shorter than all the other times Eq. 12 can be simplified in $$E = \sum_{n=1}^{\infty} E_n \delta(t - n t_c) \quad (24)$$

with $$E_n = r(nt_c) \cdot \left[E - \sum_{m=1}^{n-1} E_m\right] \quad (25)$$

Where E is the energy delivered by the FEL during the dumping of the cavity while $E_n$ is the energy coupled into the n-th pulse.

We define the normalized quantities $A_n$ $A_n | E_n/E$.

$A_n$ represent the percentage of the energy delivered by the FEL, and coupled in the n-th pulse after the cavity has been dumped. From Eqs. (24–25) we can write $$A_n = r(nt_c) \cdot \left(1 - \sum_{m=1}^{n-1} A_m\right) \quad (26)$$

$A_0 = r(t_c)$

FIG. 6 is a schematic of an FEL with an electro-optic cavity dumper. M are the mirror of the cavity, chosen with a zero transmittance, P is the Pockel cell and GT is a Glann-Thomson prism. The Pockel cell is normally off so that the Glann-Thomson prism allows a complete transmission. When the Pockel cell is on, due to the Glann-Thomson prism reflects the rotated beam completely out of the cavity.

If we assume that the voltage applied to the Pockel cell increases according to the law $$V(t) = V_0 [1 - \exp(-t/t_0)] \quad (27)$$

where $t_0$ is the transient time of the charging circuit then for the electro-optic cavity dumper the responsivity function $r(\tau)$ can be written as $$r(t) = \sin^2\left\{\frac{\pi}{2} \frac{V_0}{V_\pi}\left[1 - \exp\left(-\frac{t}{t_0}\right)\right]\right\} \quad (28)$$

where $V_{90}$ is the "half wave voltage" and can be written as (7)

$$V_\pi = \frac{\lambda}{2n_0 r_{ij}} \quad (29)$$

$n_0$ being the refractive index, $\lambda$ the wavelength in vacuo and $T_{ij}$ is the ij component of the electro-optic tensor.

Typical values of $V_\pi$ are in the kilovolt range. From Eq. (2) we can see that the time $t_1$ needed to get $r(t) = 1$ is given by $$t_1 = t_0 \lg\left[\frac{\alpha}{\alpha - 1}\right] \quad (30)$$

with $\alpha = V_0/V > 1$. This relation is critical to the design of cavity dumped FELs. Insertion of Eq. (27) into Eq. (24) would gives:

$$A_n = \sin^2\left[\frac{\pi}{2} \alpha \exp\left(-\frac{n}{\tau}\right)\right] \cdot \left(1 - \sum_{m=1}^{n-1} A_m\right) \quad (31)$$

where we have set $\tau = t_0/t_c$. In Tab. I we have listed the values of $A_n$ for different $\tau$ and $\alpha$. It can be seen that by increasing the values $\alpha$ we can compensate the effects of large values of $\tau$. This has been stressed in FIG. 7 where the amplitude of the first three coefficients have been plotted versus $\tau$ for different values of $\alpha$.

FIG. 8 is a schematic of an FEL with an acousto-optic cavity dumper. B is a Bragg cell, working as output coupler (6), and M are the mirrors chosen with a null reflectivity. Following the same reasoning as above, we can write, for an FEL with an acousto-optic cavity dumper (6)

$$A_n = \text{erf}\left(\frac{n}{\tau}\right)\left[1 - \sum_{m=0}^{n-1} A_{n-1}\right] \quad (32)$$

where $\tau = t/o/t_c$. In FIG. 9 we have plotted the relative amplitudes $A_n$ of the first five pulses delivered by the dumper. As an example, we explicitly observe that for the Mark III FEL under development at Stanford University, we have $W = 1.5$ mm. $V_s = 5.5 \cdot 10^5$ cm/sec, $t_c = 12$ ns so that $\tau \approx 2.5$. From FIG. 9 we can see that the power delivered by a dumped FEL would be divided in three pulses with almost the same peak power.

Note that for the acousto-optic dumper there would be no way to reduce $\tau$ below this number, because it would mean to focus more the mode thus, due to possible damage limiting high power operation.

FIG. 10 is a schematic of a low loss broadband electro-optic cavity dumper (EOCD) where both the Glann-Thomson and the Pockel effects take place in the same crystal with the input and the output surfaces oriented at Brewster incidence. O.A. is the optical axis and is directed normally to the plane of the figure in the left side and parallel to the small arrow in the right side.

For the sake of simplicity, here, we have considered only crystals with positive birefringence ($n_e > n_0$), $n_e$ and $n_0$ being the refractive indices for extraordinary and ordinary polarizations respectively) although the extension of the results to $n_e > n_0$ crystals with negative birefringence is straightforward.

The EOCD in FIG. 10 consists of two pieces of the same crystal cemented together and with the respective optical axis oriented in orthogonal directions. With this arrangement, when no voltage is applied to the electrodes, a beam polarized parallel to the plane of the figure will see always the same refractive index ($n_0$) when passing through the two parts of the EOCD. As the input and the output faces have been cut at Brewster incidence, the above beam will experience only the absorption losses.

Due to the electro-optic effect (3), when the proper voltage is applied to the electrodes, the incident beam will change polarization in such a way that the new beam when impinging on the interface AB will see two media with different refractive indices and will be totally reflected.

Now, as the rotated beam sees a refractive index equal to $n_0$ in the right part and equal to $n_e$ in the left part, the condition for the total internal reflection yields:

$$\sin\theta > \sin\theta_m = n_e/n_0 \qquad (33)$$

from which $L = \pi/2 - \theta$ can be cast in the form $$\alpha < \alpha_m \approx \sqrt{2(n_0 - n_e)/n_0} \qquad (34)$$

When Eqs. (33,34) are verified then the interface AB works as a Glann-Thomson prism (3), thus transforming the crystal in an output coupler. The face of the crystal, through which the output beam comes out, must be cut at the Brewster angle.

In Table I we have reported the main parameters of possible candidates to build an EOCD in the visible and infrared ranges.

We explicitly observe that minor modifications to the schematic reported in FIG. 10, could be required by the particular form of the electro-optic tensor $r_{ij}$ of the selected crystal.

As a final remark we stress that the present EOCD has the noticeable property of having only one output beam where other previous configurations (4-5) provided two output beams, one of which is usually wasted.

Double Mode-Locker

A second application of the variable output couplers described above is the double mode-locker. Free electron lasers driven by RF accelerators will, in general, deliver a train of optical pulses as determined by the spacing of the bunches in the electron beam used to drive the FEL. By modulating the FEL gain, the bunched electron beam synchronizes the phase of the possible longitudinal cavity mode resulting in the aforementioned optical pulse structure.

The output pulse structure of such an FEL can be modified by installing a fast variable output coupler within the optical cavity. If the coupler is driven by a pulsed source with a period equal to an integral multiple of the time interval between the electron bunches. the time separation between the optical pulses will increase to match the period of modulation imposed by the output coupler.

Although the physical mechanism responsible for the operation of the second mode locker is identical to the mechanism responsible for the mode locked pulse generated by the bunched electron beam, it is typically easier to alter the modulation frequency for an output coupler than to alter the accelerator operating frequency to change the spacing of the electron bunches. The variable output coupler therefore provides a means to vary the optical pulse structure at will, up to a maximum set by the round trip time of the optical pulses in the resantor.

Intracavity Higher Harmonic Generator

The mounting of a non-linear crystal inside a laser cavity to produce an high amount of higher harmonic is a well established technique for both atomic and molecular lasers. All the intracavity higher harmonic devices, built so far, have been always designed to operate at a single wavelength in such a way that an anti-reflecting coating is always possible.

The design of a non-linear crystal to perform an up-frequency conversion inside an FEL cavity requires completely different design criteria.

In fact, besides self-induced thermal and linewidth mismatch effects (4), the main problem is that, to achieve a broad band operation and to increase the damage threshold, no anti-reflecting coating can be used.

So, according to the analysis worked out in previous papers (9,10), the crystal must cut in such a way to satisfy at the same time both the Brewster and the phase matching conditions. In this way it is possible to build intracavity higher harmonic generators with very low insertion losses and a very broad band operation.

The operating bandwidth of intra-cavity harmonic generators depends on the phase matching range of the crystal and on the maximum departure from Brewster angle which can be tolerated. The crystal can be designed in the following way. As the Brewster and the phase matching condition cannot be satisfied at the same time for different wavelengths (3,10) one has before to design the crystal in such a way at the central wavelength both the Brewster and the phase matching conditions can be satisfied. Then a small tilt of the crystal can tune the crystal to a different wavelength. A careful design can keep the consequent losses to a very low value (typically less than 0.5-1% over the range of interest). See Reference 4 for a more detailed discussion of this point.

Consideration of the phase match condition leads to an expression where the harmonic generate conversion efficiency:

$$\mathrm{sinc}(\Delta K \cdot L) = \mathrm{sinc}\,[2\pi L/\lambda_1 (n^{(\omega)} - n^{(2\omega)})] \qquad (35)$$

where $\lambda_1$ and $\lambda_2$ are the first and second harmonic wavelength L is the length of the crystal $\Delta K = (1/\lambda_2 - 2/\lambda_1)2\pi$. This factor limits in the efficiency of high power higher harmonic generators. The main limits can be summarized as follows:

a. Limited operating bandwidth for any given crystal.
b. Self-induced thermal mismatch
c. Self-induced bandwidth mismatch.

Phase matching can be achieved in two different ways (11,12) which we will refer to, hereafter, as type I and II phase matching. For type I phase matching, we assume that the incoming first harmonic beam is ordinarily polarized while the second harmonic (S.H.) output beam will be generated with an extraordinary polarization. For type II phase matching we assume that the first harmonic beam is partially polarized as ordinary and partially as extraordinary polarized. This second type of phase matching can prove extremely useful in the design of autocorrelators for short pulses diagnostics (13-15).

An analysis of the conditions for which a crystal can be efficiently matched can be performed by using Sellmer relations (15) which fit the real dispersive curve in such a way that the value of the phase matching angle, derived through their use is approximated within an error of about 1°. According to these relations, we can write $$n = \left[ A + \frac{B_1}{\lambda^2 - B_2} - \frac{C_2}{C_2 - \lambda^2} \right]^{\frac{1}{2}} \quad (36)$$

where $\lambda$ is expressed in microns. In Table III we report the coefficients A, B, C for the most used non-linear crystals on the basis of Sellmer relations. It is an easy matter to derive the matching curves when the phase matching angle $\theta_m$ (the angle between the optical axis and the first harmonic beam which is required to satisfy the phase matching condition) is expressed in terms of the 1st harmonic wavelength.

Single Pulse Selector

We discussed above the possibility of increasing the output peak power of an FEL (cavity dumper) and to suppress all the pulses contained in one round trip cycle, but one (double mode locker).

Roughly speaking we can say that the double mode locker permits the one pulse per round trip operation while the cavity dumper, if properly designed, delivers all the pulses contained in one round trip, only once, after the buildup the radiation with no output coupling.

This means that if we let the cavity work with both the cavity dumper and the double mode locker, we are able to have only one giant pulse of radiation per macropulse thus realizing a single pulse selector.

If we think that the repetition rate of the macropulses can be lowered at will it becomes clear that by the proper operation of this single pulse selector the repetition frequency of the output pulses can be decreased according to the specific application.

Tunable Electro-Optic Intracavity Bandpass Filter
For FEL Sideband Suppression (11)

Due to the synchrotron oscillations the spectrum of the output power of an FEL can present some sidebands as seen in FIG. 11. The peak wavelength of these sidebands are typically separate by $\phi$ from the central operating wavelengths, where $\phi$ is the FEL synchrotron frequency. (12)

Different techniques have been proposed to suppress or reduce the amplitude of these sidebands, such as a proper tapering of the undulator or the insertion of an interferometric filter in the cavity. The first one requires that the undulator must be designed to suppress the sidebands instead of optimizing either the small signal gain or the output power. The second is limited by its very narrow operation bandwidth together with a low damage threshold.

The electro-optic effect can be used to selectively suppress this "sideband" instability by exploiting the wavelength dependence of the output coupling coefficient. With reference to FIG. 12 our device consists of an electro-optic crystal polarized in such a way that the central peak at $\lambda_0$ is not affected by the presence of the crystal. The crystal has been cut in such a way to satisfy the Brewster condition and rotate of an angle $\phi$ the polarization of the incoming beam when the wavelength $\lambda$ is different from $\lambda_0$.

Assuming that the electrons wiggle in the plane x-z (Z being the optical cavity axis), see FIG. (1) when the electric field component has been rotated of angle $\phi$, the small signal gain will be reduced to $$g = g_0 \cos^2\phi \quad (37)$$

where $g_0$ is the small signal gain at the unperturbed central frequency. Now we calculate $\phi$ as a function of the difference $\lambda - \lambda_0$. If we define, according to the standard definitions $V_\pi$ as the voltage required to rotate the polarization of the beam at $\lambda_0$ of 90° (7) then if we apply at the crystal a voltage $V = 2mV_\pi$ (m being any integer number) the central frequency $\lambda_0$ will not experience any total polarization rotation. At a different wavelength $\lambda$ a single passage through the crystal will give a rotation $\Delta\phi_1$ of the polarization given by $$\Delta\phi_1 \approx \frac{\pi}{2} \frac{V}{V_\pi} \left[ \left( \frac{\lambda - \lambda_0}{\lambda_0} \right) \right] \quad (38)$$

from which, keeping in mind that each beam passes twice through the crystal in one round trip, we get $$\phi = 2m\pi/N \quad (39)$$

having assumed $$\frac{\lambda - \lambda_0}{\lambda_0} = 1/N,$$

so that $$\frac{g}{g_0} = \cos^2\left( \frac{2M}{N} \pi \right) \quad (40)$$

where N is the number of periods of the undulator. This has been plotted in FIG. 13. From Tab. we see that at $\lambda_0 = 1$ μm values of $V_\pi$ of the order of 1kV can be obtained thus meaning that $2m \approx 20$ can be easily assumed. From Figure we see that with N=60 we can get $g/g_0 \approx 0.3$. In the Mark III FEL at Stanford University we have $g_0 \approx 30\%$, $p \approx 0.04$ (cavity losses) $q \approx 0.02$ (output coupling coefficient) so that we can say that at saturation the sidebands will be reduced by a factor roughly equal to $$\frac{g - p - t}{g_0 - p - t} \simeq 0.16 \tag{41}$$

A complete suppression of the sidebands would require with $g_0 0.3$, $p = 0.04$. $Q = 0.02$, $$\frac{2m}{N} \geq 0.35$$

not too difficult to achieve in many practical cases.

On the same line of argument a sideband suppressor, exploiting the acousto-optic effect, can be easily designed.

REFERENCES

1. Special issue on "Free Electron Lasers" IEEE J. of Quantum Electronics. QE- (May 1985) and references herein enclosed.
2. A. Cutolo, B. T. Yakubi, J. M. Madey, Broadband optical cavities for infrared FELs: analysis and preliminary experimental results, Appl. Opt. 23, 2935-2943 (1984).
3. A. Cutolo, J. M. Madey, Acousto-optic output coupler for free electron lasers in "Free Electron Generators of Coherent Radiation", SPIE - 453 100-107 (1983).
4. A. Cutolo J. M. Madey, Self-induced mismatch in non-linear optical interactions, IEEE J. of Quant. Electron., QE-21, 1104-1107 (1985).
5. A. Cutolo, Transient behavior in the acousto-optic effect, Lett. Nuovo Cimento 41, 139-144 (1984).
6. A. Cutolo, S. V. Benson, J. M. Madey, Cavity Dumping for Free Electron Lasers", IEEE J. of Quantum Electronics (in print).
7. A. Yariv, Quantum Electronics, 2nd Ed., J. Wiley and Sons (N.Y. 1977).
8. S. V. Benson, Diffraction effects and noise in short pulse FELs. Ph.D. Thesis, Stanford (1985).
9. A. Cutolo, M. M. Madey, Second Harmonic Generation with high power short pulses from a free electron laser, in "Free Electron Generators of Coherent Radiation", SPIE-453, 75-84 (1983).
10. S. V. Benson, A. Cutolo, J. M. Madey Higher Harmonic Generators for Free Electron Lasers, IEEE J. of Quantum Electronics (in print).
11. J. E. Bjorkholm, Optical Second Harmonic Generation Using a Focused Laser Beam, Phys. Rev. 142, 126-133 (1966).
12. G. D. Boyd, D. A. Kleinman, Parametric Interaction of Focused Gaussian Laser Beams, J. Appl. Phys. 39, 3597-6018 (1968).
13. F. Zernike, J. E. Midwinter, Applied Non-linear Optics, J. Wiley and Sons (N.Y. 1973).
14. E. P. Ippen and C. V. Shank, Techniques for measurements, in "Ultra Short Light Pulses" ed. by S. L. Shapino Springer Verlag (N.Y. 1976) pg. 83-119 and references enclosed.
15. See for instance, F. T. Arecchi and E. O. Schultz Dubois Eds. "Laser Handbook" Vol. II, North-Holland (1972).
16. A. Cutolo. S. V. Benson, J. M. Madey, Intracavity tunable electro-optic filters for sideband suppression in an FEL, Appl. Phys. Lett. (in print).

TABLES

Table I Main acoustic and optical properties of LiNbO$_3$ and Ge.

Table II Sellmer constants for the most useful crystals for S.H.G. ($\sigma$ and e stand for ordinary and extraordinary polarization respectively, while for LiNbO$_3$, $\tau$ is the absolute temperature expressed in °K.

Table III. Values of $V_\pi$ (in kilowatts) for different crystals assuming a transverse electro-optic effect.

TABLE I

Main Properties of Ge and LiNbO$_3$ Useful for Designing the Output Couplers

| Crystal | Index of refraction | Optical absorption coefficient | Acoustical absorption coefficient$^c$ (at f = 500 MHz) (dB/sec) | Optical wave polarization and direction | Acoustic wave polarization and direction | Figure of merit M (m$^2$/W) | Velocity of sound (cm/sec) |
|---|---|---|---|---|---|---|---|
| Ge | ~4 | 0.039 cm$^{-1}$ (at $\lambda$ = 10 $\mu$m) | 4.2 | $\parallel$ | Long. (111) | 810 × 10$^{-15}$ | 5.5 × 10$^5$ |
| LiNbO$_3$ | ~2.2 | 10$^{-3}$ cm$^{-1}$ ($\lambda \approx$ 0.5-6.5 $\mu$m) | 0.8 | $\parallel$ or $\perp$ | Trans. (100) | 290 × 10$^{-15}$ 7 × 10$^{-15}$ | 3.5 × 10$^5$ 6.6 × 10$^5$ |

To get the highest figure of merit using a LiNbO$_3$ crystal the acoustic wave must be longitudinal and propagate along the axis. The optical beam must be extraordinarily polarized and make an angle of 35° with the y axis.
Acoustic attenuation is proportional to the square of the frequency.

Note: We counld not use Ge in the high figure of merit configuration because it was not possible to satisfy at the same time the polarization requirements imposed by the Brewster condition and by this table. Here the optical E field is assumed polarized in the plane formed by the acoustic and optical wave vectors.

TABLE II

| Material | Ray | A | Sellmer Constants B$_1$ | B$_2$ | C$_1$ | C$_2$ |
|---|---|---|---|---|---|---|
| LiNbO$_3$ | o | 4.313 | 0.1173 1.65 · 10$^{-8}$T$^2$ | 0.212 + 2.7 · 10$^{-8}$T$^2$ | −0.0278 · $\lambda^4$ | 0 |
| | e | 4.5567 + 2.6 · 10$^{-7}$T$^2$ | 0.037 + 2.7 · 10$^{-8}$T$^2$ | 0.201 + 5.4 · 10$^{-8}$T$^2$ | −0.0224 · $\lambda^4$ | 0 |
| kDP | o | 2.253276 | 0.01008356 | 0.012342625 | 13.00522 · $\lambda^2$ | 400 |
| | e | 2.132668 | 0.008637434 | 0.012281043 | 3.227332 · $\lambda^2$ | 400 |
| ADP | o | 2.302842 | 0.0111251 | 0.0132536 | 15.102464 · $\lambda^2$ | 400 |
| | e | 2.163510 | 0.0096166 | 0.0129891 | 5.919896 | 400 |
| Ag$_3$AsS$_3$ | o | 9.220 | 0.4454 | 0.1264 | 1733 | 1000 |
| (Proustite) | e | 7/007 | 0.3230 | 0.1192 | 660 | 1000 |
| L$_1$IO$_3$ | o | 3.407 | 0.05059 | 0.03049 | 0 | 0 |
| | e | 2.923 | 0.03423 | 0.02015 | 0 | 0 |
| Te | o | 22.81 | 18.359 | 3.2090 | 0 | 0 |

TABLE II-continued

| Material | Ray | A | Sellmer Constants B$_1$ | B$_2$ | C$_1$ | C$_2$ |
|---|---|---|---|---|---|---|
| MgS | e | 38.709 | 28.319 | 1.0475 | 0 | 0 |
|  | o | 3.3139 | 0.5870 | 0.1166 | 542.6 | 682.5 |
|  | e | 7.8113 | 0.3944 | 0.1172 | 604.5 | 540.8 |
| $\beta$-BaB$_2$O$_4$ | o | 2.7359 | 0.01878 | 0.01822 | $-0.01354\lambda^4$ | 0 |
|  | e | 2.3753 | 0.01224 | 0.01667 | $-0.01516\lambda^4$ | 0 |

TABLE III. Values of $V_\pi$ (in kV) for different crystals assuming a transverse electro-optic effect.

We assumed d=1 cm, l=1 cm, $\lambda_o$=1 μm. We stress that $V_\pi \lambda_o \cdot d/l$. When different values are listed, they refer to different orientation of the crystal.

| ADP | LiNbO$_3$ | ZnSe | BaTiO$_3$ |
|---|---|---|---|
| 18 kV | 13.5 kV, 1.6 kV | 1.52 kV, 5.53 kV | 1.43 kV, 0.6 kV |

What is claimed is:

1. An improved free-electron laser (FEL) oscillator comprising:
   an electron accelerator system which injects a beam of relativistic electrons along an axis;
   undulator means for generating a periodic transverse motion of said beam about said axis;
   a set of mirrors disposed about said axis defining a resonant optical cavity along said axis, said cavity having an optical length that defines a round-trip cavity transit time; and
   a transmissive non-linear optical means mounted on said axis for producing a phase-matched interaction between the optical wave supported by said resonator and a field in the group consisting of an externally applied acoustic field, an externally applied electric field, and the optical wave itself, thereby modulating the amplitude polarization, or wave vector of the optical wave.

2. An FEL oscillator according to claim 1 wherein said non-linear optical means comprises an acousto-optic element which modulates the amplitude of the optical wave at an integral sub-multiple of round-trip cavity transit time, thereby generating a train of optical pulses separated by the period at which the optical field is modulated.

3. An FEL oscillator according to claim 2 wherein said electron accelerator system is a radio-frequency linear accelerator producing a bunched electron beam, and the period of the amplitude modulation induced by said acousto-optic element is an integral multiple of the electron bunch spacing.

4. An FEL oscillator according to claim 1 wherein said non-linear optical means comprises an electro-optic element which modulates the amplitude of the optical wave at an integral sub-multiple of round-trip cavity transit time, thereby generating a train of optical pulses separated by the period at which the optical field is modulated.

5. An FEL oscillator according to claim 4 wherein said electron accelerator system is a radio-frequency linear accelerator producing a bunched electron beam, and the period of the amplitude modulation induced by said electro-optic element is an integral multiple of the electron bunch spacing.

6. An FEL oscillator according to claim 1, wherein said non-linear optical means comprises an electro-optic output coupler having associated means for generating and applying an electric pulse to the electro-optic coupler on a time scale short compared to the round-trip cavity time, whereby essentially all the optical energy stored in said cavity is deflected out of said cavity by said output coupler as the optical wave passes through said output coupler.

7. An FEL oscillator according to claim 6, and further comprising an acousto-optic element for modulating the amplitude of the optical wave so as to generate a train of optical pulses separated by a submultiple of the round-trip cavity transit time.

8. An FEL oscillator according to claim 6, and further comprising an electro-optic element for modulating the amplitude of the optical wave so as to generate a train of optical pulses separated by a submultiple of the round-trip cavity transit time.

9. An FEL oscillator according to claim 1 in which said non-linear optical means comprises a nonlinear electro-optic element coupled to a Glan-Thomson prism in which the rotated optical wave is deflected from said cavity as a single beam.

10. An FEL oscillator according to claim 1 in which said non-linear optical means comprises a crystal selected to support the phase-matched propagation of the optical wave in said cavity and a harmonic of the optical wave, thereby generating high-power radiation at the harmonic of the optical wave.

11. An FEL oscillator according to claim 10, and further comprising output coupler means for selectively coupling light at the harmonic out of said cavity while allowing light at the fundamental to remain in said cavity.

12. An FEL oscillator according to claim 1 in which said non-linear optical means comprises an electro-optic output coupler driven to produce a net polarization rotation of integral $2\pi$ radians at the operating frequency, whereby power at synchronotron sidebands of the optical carrier is selectively coupled out of said cavity.

* * * * *